W. A. & C. E. Dryden,

Cultivator.

No. 4252. Reissued Feb. 7. 1871.

Witnesses:
W. H. Fuller
Wm. R. Manton

Inventors
W. A. & C. E. Dryden
By Farwell, Ellsworth & Co.
Attorneys.

N. PETERS, PHOTO-LITHOGRAPHER, WASHINGTON, D. C.

UNITED STATES PATENT OFFICE.

AUGUSTUS ADAMS, OF SANDWICH, ILLINOIS, ASSIGNEE OF WILLIAM A. AND CYRUS E. DRYDEN.

IMPROVEMENT IN CULTIVATORS.

Specification forming part of Letters Patent No. 67,173, dated July 30, 1867; Reissue No. 4,252, dated February 7, 1871.

*To all whom it may concern:*

Be it known that we, WILLIAM A. DRYDEN and CYRUS E. DRYDEN, of Monmouth, in the county of Warren and State of Illinois, have invented certain new and useful Improvements in Cultivators; and we do hereby declare the following to be a full, clear, and exact description thereof, which will enable others skilled in the art to which our invention appertains to make and use the same, reference being had to the accompanying drawings, forming part of this specification.

Figure 1:
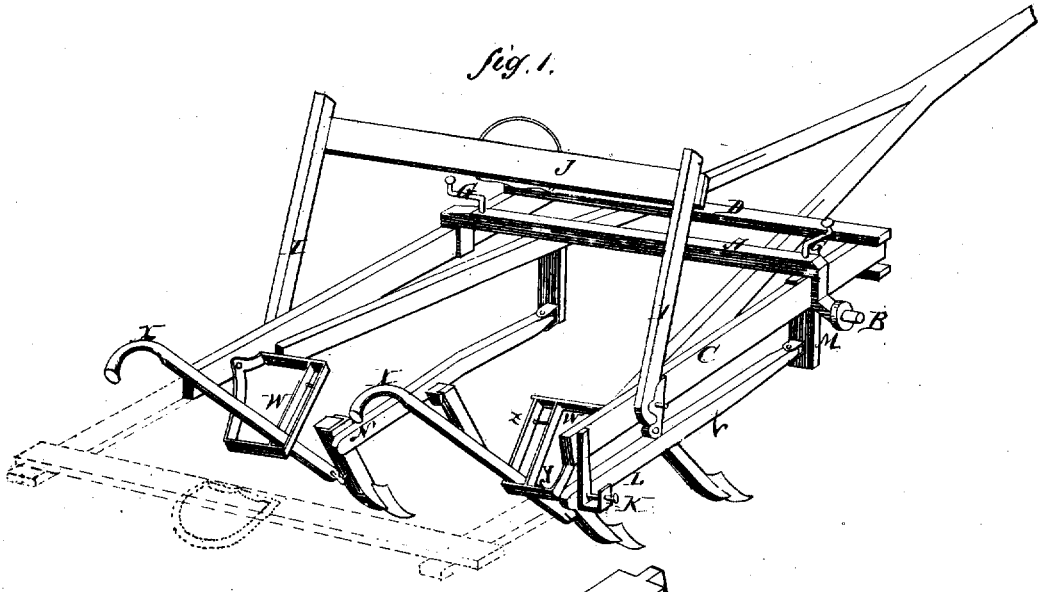
Figure 3:
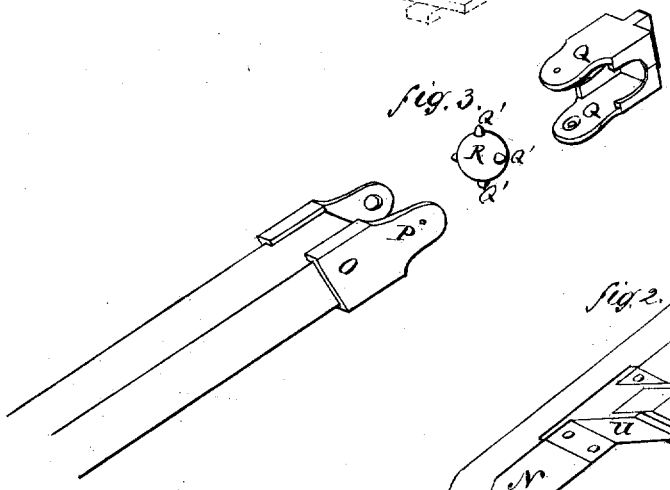
Figure 2:
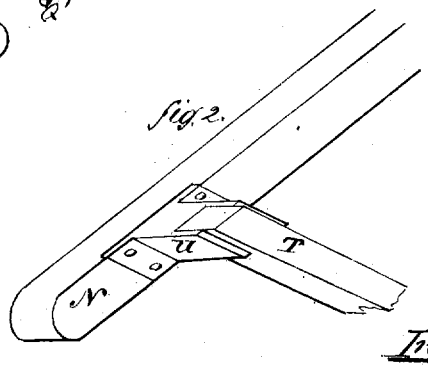

Figure 1 is a perspective view of a cultivator containing our improvements. Fig. 2 is a detached section, showing the manner of attaching the cultivator-shanks to the beams. Fig. 3 is a perspective view of one of the plow-beams and its connections detached from the machine.

Similar letters of reference indicate corresponding parts in the several figures of the drawings.

It is necessary to the successful operation of cultivators that the frame be balanced upon its supports under all circumstances. In that class of cultivators which are operated by the driver, either walking or riding, the balance of the frame is materially affected. If it is balanced upon its supports when the driver is walking, a preponderance of weight will be thrown either forward or in rear of the wheels, according to the position of the seat after the driver mounts.

To overcome this objection is primarily the object of our invention; and to this end it consists in making the frame of a cultivator adjustable longitudinally upon the axle or its other supports.

Our invention consists, secondly, in a seat which is adapted to be turned up or moved out of the way when the driver is walking and thrown into position to form a riding cultivator.

It consists, thirdly, in making the seat adjustable within itself for convenience in balancing the frame while riding when the plows are in or out of the ground and for other occurring differences in weight.

It consists, fourthly, in the vertical adjustment of the seat when turned down for use to admit of the cultivation of large as well as small plants.

It consists, fifthly, in the combination of the tongue or pole of the machine with the frame supporting the operating parts, whereby the frame is adapted to be moved by the team forward and backward upon the axle to adjust the balance.

In the accompanying drawings, A is a bent or angular axle, mounted upon the wheels B.

The frame of the cultivator is composed of two side pieces, C, which are secured together at their forward ends by a cross-bar, D, and at or near their rear ends by the bifurcated end of the draft-pole E, which passes between them, or by braces extending forward to form the draft-pole, or attached to a straight pole. The side pieces, C, are adapted to slide freely through slots F formed at or near the angles of the axle, and are held in any desired position by means of the set-screws G, which pass through the axle into the slots.

The driver's seat is composed of two side bars, I I, hinged or pivoted at one end to the side pieces, C, in rear of the axle, and provided at their outer ends with the seat-bar J, which is adapted for adjustment upon the side bars by any suitable means.

As shown in Fig. 1, the cultivator-frame is balanced for use with the operator walking, the seat being turned up out of the way. When it is desired to adjust the machine for riding so that it shall be balanced under the weight of the driver, the set-screws G are loosened, and the axle is held by the hand. The team is then started up and the side pieces are drawn through the axle to the required extent, when the set-screws are again tightened and the seat turned down to receive the driver, as shown by dotted lines, Fig. 1. The difference in the disposition of the weight of the frame when the plows are in and out of the ground, and for other occurring causes, is easily and expeditiously regulated while the driver is riding by adjusting the seat-bar J upon the side bars, I.

K are angle-irons depending from the rear ends of the side pieces, C, of the frame, to support the side bars of the seat when the latter is turned down to form a riding cultivator. By changing the pins L higher or lower in the series of holes formed in the angle-irons the seat is adjusted vertically to clear the tops of plants of different heights and growths.

M are the bars or arms depending from the front end of the frame, as shown in Fig. 1. To the lower ends of these bars the plow-beams N are attached in the following manner, to permit a rotary or combined vertical and lateral movement of the plows in cultivating. To the lower end of each of the bars M is secured a metallic socket, O, composed of one or more pieces, with its projecting arms P placed one above the other. The ends of the arms are recessed upon their proximate surfaces to receive knobs or projections Q Q, formed upon opposite sides of a ball, R. (Shown in Fig. 3.) Similar knobs, Q′ Q′, are also formed upon the ball opposite to each other in a line at right angles to the knobs Q, and are adapted to fit within corresponding recesses in the metal plates S S, which are secured to the ends of the plow-beams upon opposite sides. By this connection the plows are permitted both vertical and lateral movement.

In order to avoid the use of cumbersome and expensive braces, the shanks T of the cultivator-plows are attached to the beams N by means of metallic sockets U, bolted firmly to the side of the beam, as shown in Fig. 2. The flanges of the socket receive the strain of the shank, and the extension of the base on the beam serves the purpose of braces. To obtain greater leverage and better control of the plows a slotted fulcrum-frame, W, is secured to each side of the cultivator-frame, as shown in Fig. 1. The handles X of the plow-beam pass through these frames, and by means of hooks Y upon the former and the cross-bars Z in the frames, the plows may be held up while the cultivator is turning, &c.

Having thus described our invention, what we claim as new, and desire to secure by Letters Patent, is—

1. The frame of a wheeled cultivator, adjustable longitudinally upon its axle or other support, for the purpose specified.

2. In a wheeled cultivator, a driver-seat adapted to be thrown into position to form a riding-cultivator, and to be turned or moved out of the way of the driver when walking, for the purpose specified.

3. The adjustable seat-bar J, in combination with the pivoted side bars, I, for the purpose specified.

4. The driver's seat of a cultivator, adapted for vertical adjustment with relation to the frame by the means substantially as described, for the purpose specified.

5. The combination of the cultivator-frame with the bifurcated tongue or extended braces, for the purpose specified.

WILLIAM A. DRYDEN.
CYRUS E. DRYDEN.

Witnesses:
P. S. HOOK,
JAS. MASON,
EDSON TURNER,
HENRY A. ADAMS.